(12) United States Patent
Canino

(10) Patent No.: US 7,086,199 B2
(45) Date of Patent: Aug. 8, 2006

(54) AUTOMATIC LIQUID DELIVERY SYSTEM WITH TIME-DELAY RELEASE MECHANISM

(76) Inventor: Thomas L. Canino, 11631 Laurel La., Parker, CO (US) 80138

( * ) Notice: Subject to any disclaimer, the term of this patent is extended or adjusted under 35 U.S.C. 154(b) by 0 days.

(21) Appl. No.: 10/212,637

(22) Filed: Aug. 6, 2002

(65) Prior Publication Data
US 2004/0025436 A1 Feb. 12, 2004

(51) Int. Cl.
*A01G 29/00* (2006.01)
*B67D 5/14* (2006.01)

(52) U.S. Cl. .......................................... 47/48.5; 222/67
(58) Field of Classification Search .......... 222/416, 222/650; 23/259; 422/100
See application file for complete search history.

(56) References Cited

U.S. PATENT DOCUMENTS 2,991,911 A * 7/1961 Spain .......................... 222/67
3,125,255 A * 3/1964 Kaiser .................... 222/189.06
6,000,425 A * 12/1999 Steinorth ..................... 137/391

* cited by examiner

*Primary Examiner*—Teri Pham Luu
*Assistant Examiner*—Francis T. Palo
(74) *Attorney, Agent, or Firm*—John L. Isaac

(57) ABSTRACT

A timed-release irrigation device is disclosed. The device includes a first fluid reservoir having an upper cover portion adapted to enclose a first body of liquid. A liquid discharge member projects from the first fluid reservoir for enabling selective release of liquid therefrom. A second fluid reservoir is provided for containing a second body of liquid in fluid communication with the ambient environment. The second fluid reservoir has a closed bottom portion and a mechanism for regulating the evaporation rate of the second body of liquid to the ambient environment. Finally, a trigger mechanism is provided for releasing the liquid from the first fluid reservoir through the discharge member, the trigger mechanism being actuated by the evaporation rate regulating mechanism.

22 Claims, 6 Drawing Sheets

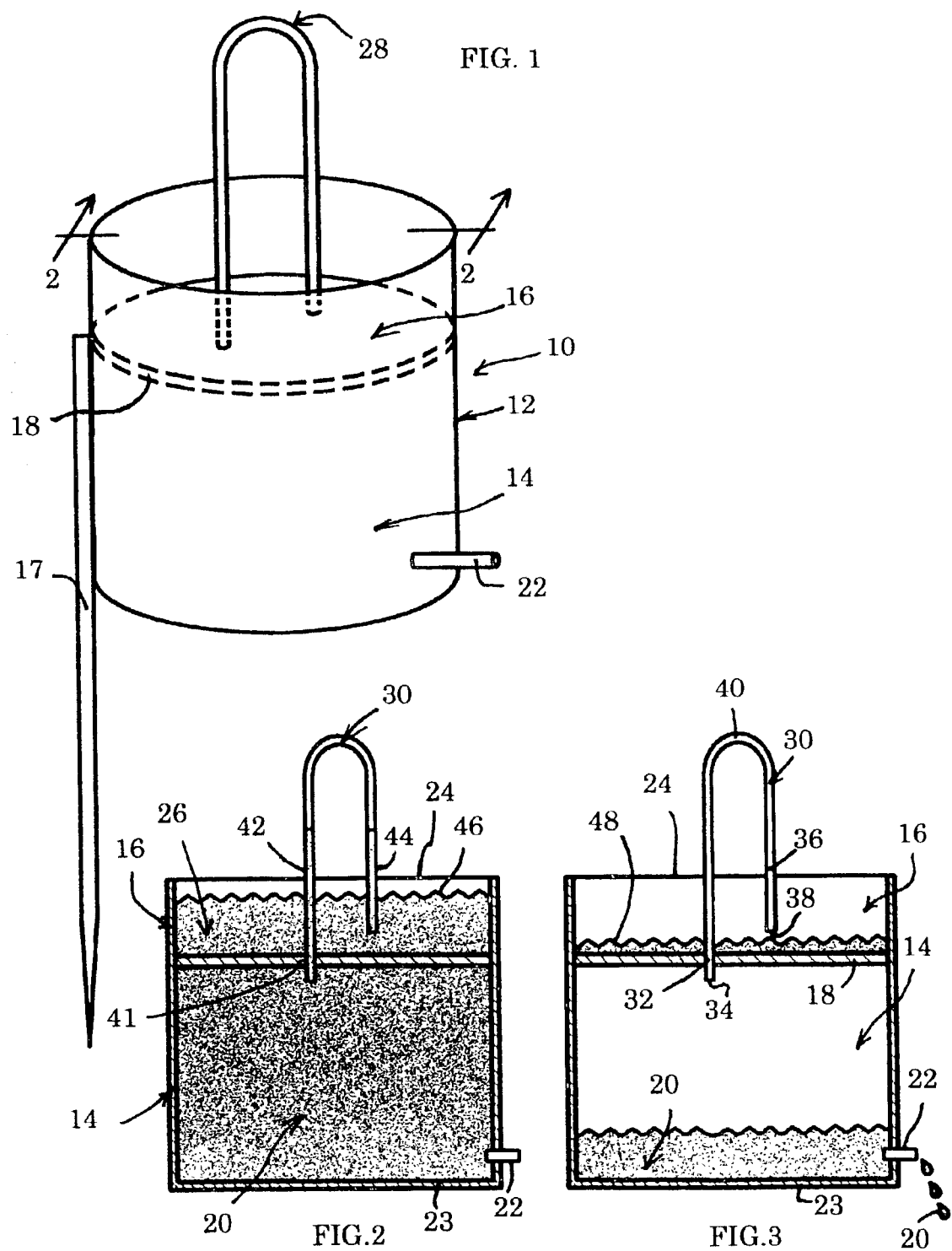

AUTOMATIC LIQUID DELIVERY SYSTEM WITH TIME-DELAY RELEASE MECHANISM

BACKGROUND OF THE INVENTION

1. Field of the Invention

The present invention relates generally to automatic liquid delivery systems and, more particularly, to a self-powered apparatus for time delayed delivery of liquid to an end-user. Specifically, the present intention relates to an automatic liquid delivery system having a time delayed release mechanism controlled by liquid evaporation rates.

2. Description of the Prior Art

Automatic liquid delivery systems in the form of time release plant watering devices are well known in the art. Such devices are generally designed to meter out water to a plant on a gradual or timed basis or upon certain soil conditions as measured by the device. The purpose of such devices is to enable plants to be watered on a regular basis automatically without requiring constant human monitoring. Moreover, such devices are quite useful for watering household plants during a period of time when the household is vacant, such as when one is on a vacation or the like. Unfortunately, such devices tend to be somewhat complex in nature and construction.

U.S. Pat. No. 3,856,205, No. 4,542,762 and No. 5,956,899 all disclose automatic liquid delivery systems that include soil-monitoring sensors which detect soil moisture level. These devices are constructed so that when the soil monitor determines that the moisture level in the soil has fallen below a pre-established level, the device then adds water to the plant soil.

U.S. Pat. No. 4,846,206 teaches an automatic liquid delivery device for watering one or more plant locations using siphoning action as opposed to gravity feed. U.S. Pat. No. 5,542,605 discloses an automatic liquid dispensing device for watering plants in discrete time intervals also using siphoning action, in part. Both of these patents disclose watering system features which contain two liquid reservoirs requiring movement of liquid from one reservoir to the other in order to accomplish the desired siphoning action and timed liquid release.

As can be seen from the above, there are numerous types of systems available to accomplish automatic liquid delivery for watering plants or the like. However, all of these systems are rather complex in operation and construction. Consequently, the use of such systems tend to be expensive, difficult to set up and operate, and easy to clog or malfunction. Thus, there remains a need for a simple automatic watering device for plants or other end users which does not require outside power sources or complex monitoring devices yet enables time delayed release of water to plants or other end users.

SUMMARY OF THE INVENTION

Accordingly, it is one object of the present invention to provide automatic liquid delivery system.

It is another object of the present invention to provide an automatic irrigation device having a time-delay release mechanism for delivering liquid.

Yet another object of the present invention is to provide a plant-watering device which does not require external power sources or soil monitoring elements.

Still another object of the present invention is to provide a time-delayed release mechanism for a liquid delivery system which is controlled by liquid evaporation rates.

To achieve the foregoing and other objects and in accordance with the purpose of the present invention, as embodied and broadly described herein, a timed-release irrigation device is disclosed. The device includes a first fluid reservoir having an upper cover portion adapted to enclose a first body of liquid. A liquid discharge member projects from the first fluid reservoir for enabling selective release of liquid therefrom. A second fluid reservoir is provided for containing a second body of liquid in fluid communication with the ambient environment. The second fluid reservoir has a closed bottom portion and a mechanism for regulating the evaporation rate of the second body of liquid. Finally, a trigger mechanism is provided for releasing the liquid from the first fluid reservoir through the discharge member when the trigger mechanism is actuated by the evaporation rate regulation mechanism.

In one aspect of the invention, the first fluid reservoir is enclosed by the upper cover portion and is sized and shaped to store the first body of liquid for gravity fed, time-delayed release through the discharge member. In addition, the second fluid reservoir is sized and shaped to contain the second body of liquid in selectively variable amounts with the evaporation rate regulation mechanism in the form of an upper open surface in communication with the ambient environment to enable controlled evaporation of the second body of liquid to the environment. In one form, the evaporation rate regulation mechanism comprises an upper surface entirely open to the ambient environment. In another form, the evaporation rate regulation mechanism is a top cover member disposed over the upper surface and has a plurality of apertures disposed therein to provide communication with the ambient environment.

In another aspect of the invention, the trigger mechanism includes a tubular element having first and second end portions which in turn define first and second end openings, respectively, and a central arcuate portion intermediate the first and second end portions. In one form, the tubular element first end portion is disposed within the first fluid reservoir for fluid communication with the first body of liquid, and the tubular element second end portion is disposed proximate the closed bottom portion of the second fluid reservoir for fluid communication with the second body of liquid.

In yet another form of the invention, the central arcuate portion of the tubular element is arranged to project above both the first and the second fluid reservoirs an effective amount to form a vacuum therein to prevent the release of liquid from the first fluid reservoir until evaporation of the second body of liquid. The tubular element second end opening is preferably selectively positioned above the second fluid reservoir closed bottom portion to permit evaporation of the second body of fluid to below the level of the second end opening to thereby terminate the vacuum in the arcuate portion and activate fluid flow through the discharge member.

In still another form of the invention, the first fluid reservoir further includes a mounting bracket for attachment to a container adapted to receive fluid flow from the fluid discharge member. In one aspect of this form, the container is in the form all of a flowerpot, and the mounting bracket is adapted to secure the first fluid flow reservoir to the edge of the flowerpot.

In another aspect of the present invention, an automatic liquid delivery system is disclosed and includes an enclosed container adapted for storing a first liquid for selective delivery to an end user. An outlet conduit is provided for delivering the first liquid from the container to the end user. A receptacle is adapted for storing a system activation fluid. The receptacle is in fluid communication with the ambient environment to enable evaporation of the activation fluid. Finally, a vacuum release mechanism is provided for initiating time-delayed delivery of the first liquid through the conduit to the end user, the vacuum release mechanism being controlled by the evaporation rate of system activation fluid from the receptacle.

In yet another aspect of the present invention, an evaporative trigger mechanism is disclosed for an automatic watering device which has a container for storing water to be released in a time-delayed manner. The trigger mechanism includes a chamber for enclosing an activation fluid. The chamber is in fluid communication with the ambient environment. A conduit interconnects the chamber with the water storage container. The conduit has a first end portion which defines a first end opening disposed in the water storage container, and a second end portion which defines a second end opening disposed in the chamber. Finally, a loop-shaped central conduit portion is provided intermediate the first and second end portions and is sized and shaped to form a vacuum therein when the chamber is filled with activation fluid.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings:

FIG. 1 is a side perspective view of one embodiment constructed in accordance with the present invention;

FIG. 2 is a cross sectional view taken substantially along line 2—2 of FIG. 1 and illustrating the embodiment thereof in an initially filled condition;

FIG. 3 is a cross sectional view substantially identical to that of FIG. 2 illustrating the embodiment thereof in a liquid released state after a time delay;

DETAILED DESCRIPTION OF THE PREFERRED EMBODIMENTS

Figure 4:
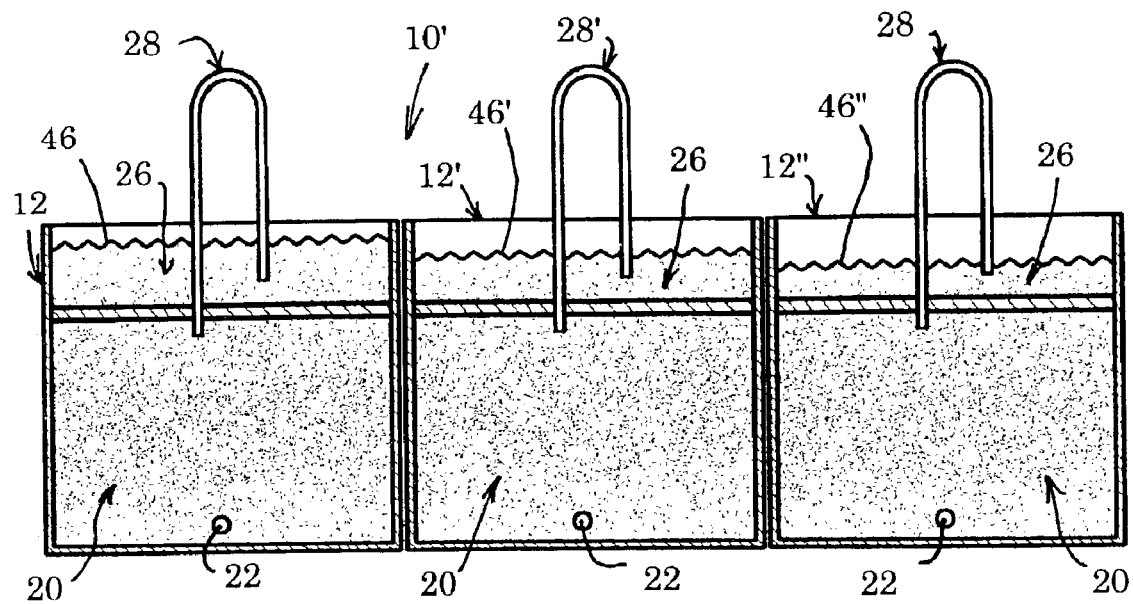
FIG. 4 is a cross sectional view similar to that of FIG. 2 but illustrating three of the embodiments thereof interconnected together as a single unit.

Referring first to FIGS. 1–3, a first embodiment of the present invention is illustrated in the form of an automatic watering device particularly adapted for use with potted plants, flowers and the like. In this one preferred form of the invention, the device 10 includes a container 12 having a first compartment or reservoir 14 and a second compartment or reservoir 16. A spike 17 or other similar attachment arm may be utilized to position the device 10 in the soil of a potted plant or the like. In this particular form of the invention, the first compartment 14 is in the form of an enclosed chamber in the lower portion of the container 12. The first compartment 14 includes an upper cover 18 which encloses a first liquid 20 therein. The first liquid 20 is preferably water which is to be provided to a potted plant or flower (not illustrated). A discharge tube 22 penetrates the side of the first compartment 14 proximate the bottom 23 thereof. The discharge tube 22 is provided for releasing the water 20 from the first compartment 14 to a plant as illustrated in FIG. 3.

The present invention provides a mechanism for releasing the water 20 through the discharge tube 22 in a time-delayed fashion. In this particular embodiment, the second compartment or reservoir 16 is in the form of an upper chamber of the container 12 and has as its bottom portion the upper cover 18 of the first compartment 14. In this particular embodiment, the upper portion 24 of the second compartment 16 is open in its entirety. In preferred form, the second compartment 16 is filled with a second body of liquid 26, which in this particular embodiment is also water. It should be understood, however, that any type of liquid capable of evaporation may be used as the second body of liquid 26. Since the upper portion 24 is open in its entirety, the second body of liquid 26 is exposed to the ambient environment surrounding the device 10. In this manner, the second body of liquid 26 will evaporate over time until the second compartment 16 is virtually empty, depending on the nature of the liquid 26 and the dryness or humidity of the ambient environment surrounding the device 10.

A trigger mechanism 28 is provided for releasing the first body of liquid 20 through the discharge tube 22 in a time delayed manner. The mechanism 28 is preferably in the form of a conduit or tube 30 which includes a first end portion 32 terminating in a first end opening 34, and a second end portion 36 terminating in a second end opening 38. A central arcuate portion 40 preferably in the form of a loop is positioned between the first and second end portions 32,36. An opening 41 is located in the upper cover 18 of the first compartment 14. The opening 41 is sized to permit the first end portion 32 to snugly pass therethrough so that the first end opening 34 is located within the upper portion of the first compartment 14. The second end portion 36 is positioned within the second compartment 16 so that the second end opening 38 is located proximate but spaced from the bottom of the first compartment 16.

The conduit 30 is sized so that the central arcuate portion 40 is positioned above both the first and second compartments 14,16. In this manner, when both the compartments 14,16 are filled with water as illustrated in FIG. 2 with the conduit 30 positioned as illustrated, water 42 from the first body of liquid 20 moves up into a portion of the first end portion 32 of the conduit 30, while water 44 from the second body of liquid 26 moves up into a portion of the second end portion 36. The simplest way of creating this situation is to plug the discharge 22 and then pour water through the open upper end portion 24 with the conduit 30 removed from its position. In this manner, water will fill the first compartment 14 through the opening 41 and form the first body of water 20. The water will then fill the second compartment 16 to form the second body of water 26. When the desired level 46 of water 26 is achieved within the second compartment 16, the conduit 30 is then put into its position as illustrated.

When this occurs, the water portions 42,44 will fill appropriate segments of the conduit 30, and a vacuum will then be created in the arcuate portion 40. At this point in time, the discharge opening or tube 22 may be unplugged, and the vacuum created within the trigger mechanism 28 will retain the first body of water 20 within the first compartment 14 despite an open discharge tube 22.

Since the upper end portion 24 of the second compartment 16 is exposed to the ambient environment, the second body of water 26 will evaporate over time, thereby lowering the level 46 within the second compartment 16. Once the level of the second body of liquid 26 has been lowered to that illustrated at 48 in FIG. 3, the second end opening 38 is exposed to the ambient environment, and the vacuum in the central arcuate portion 40 is then terminated. Since it is this vacuum which retains the first body of liquid 20 within the first compartment 14, the first body of water 20 will now be released to flow through the discharge tube 22 as illustrated in FIG. 3 to be directed to the desired end user, in this instance a plant.

Referring now to FIG. 4, an automatic watering device 10' may include a plurality of containers 12, 12', 12" which, as illustrated, are interconnected to each other. Each of the three illustrated containers 12, 12' and 12" is substantially identical to the container 12 as illustrated in FIG. 2. In this instance, however, the initial liquid levels 46,46' and 46" of the second body of liquid 26 are different in each container. As illustrated, the level 46 is higher than the level 46' which in turn is higher than the level 46" of the third container 12". As a result of this, the second body of liquid 26 in the container 12" will evaporate first, releasing the first body of liquid 20 from the container 12". After an additional period of time, perhaps days, the second body of liquid 26 of the container 12' will fully evaporate thereby releasing the first body of liquid 20 therefrom. Finally, after yet additional time has passed, the second body of liquid 26 of the container 12 will completely evaporate thereby releasing the first body of fluid 20 therefrom. In this manner, three separate and distinct watering events can be arranged and spaced in time for the same end user, such as a potted plant or flower. Depending on the size of the second bodies of liquid 26 in each of the containers 12, 12', 12" and the ambient environment conditions, a plant to which the device 10' is attached may be watered every three-five days without human intervention.

Figure 5:
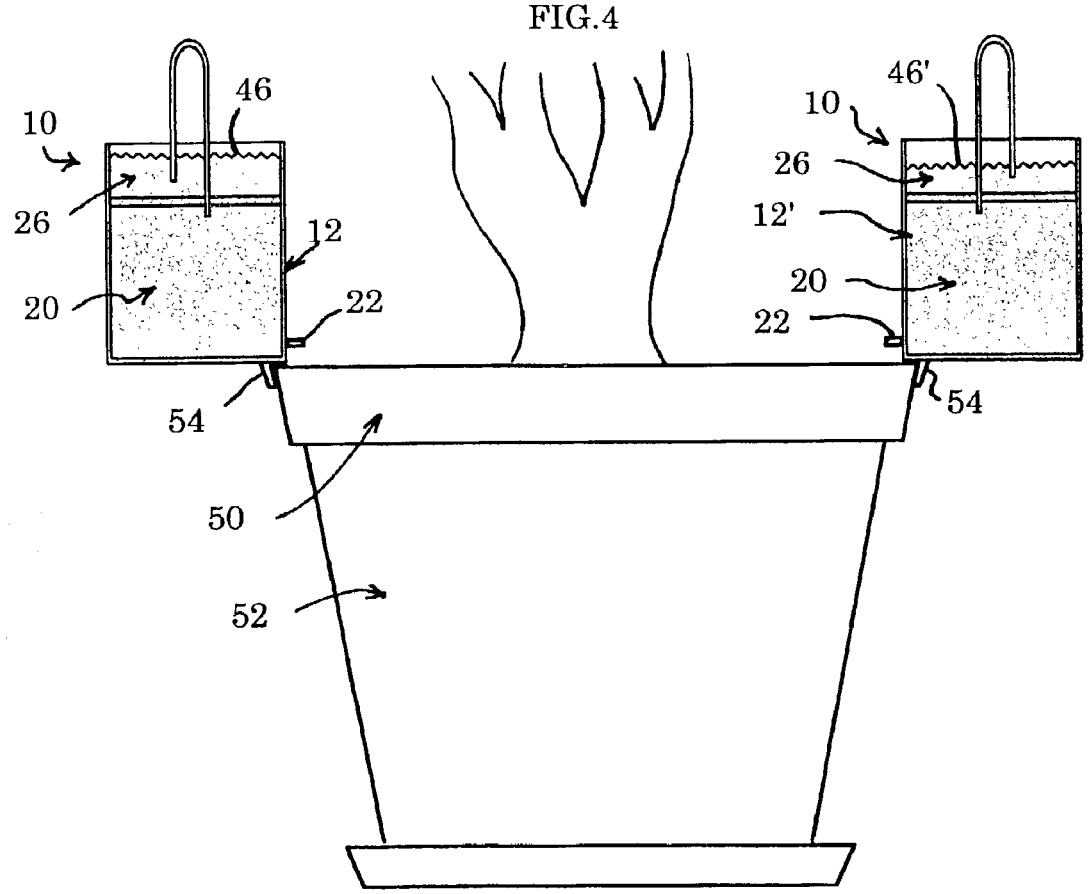
FIG. 5 is a side perspective view, with parts in cross-section, of a potted flower and illustrating a pair of the embodiments of FIG. 2 in cross sectional view attached thereto.

Referring now to FIG. 5, a pair of the containers 12,12' are each individually mounted to a rim 50 of a flower pot 52. In each instance, a mounting bracket 54 is utilized to mount each of the containers 12,12' to the rim 50. In this particular illustration, the container 12' has a second body of water 26 which has a lower initial starting level 46' then that of the second body of water 26 of the container 12. As in the prior embodiment, the body of water 26 of the container 12' will therefore evaporate sooner then the body of water 26 of the container 12. This means that the body of water 20 from the container 12' will be released first into the flower pot 52, followed by the body of water 20 of the container 12 several days later after further evaporation of the larger quantity of liquid 26 from the container 12. While the embodiment illustrated in this FIG. 5 shows only two time release watering devices 10, it should be understood that any number of the devices 10 can be mounted to a flower pot 52 with different quantities of water 26 in the second compartments thereof, thereby providing a series of time release watering events for the flower pot 52.

Figure 6:
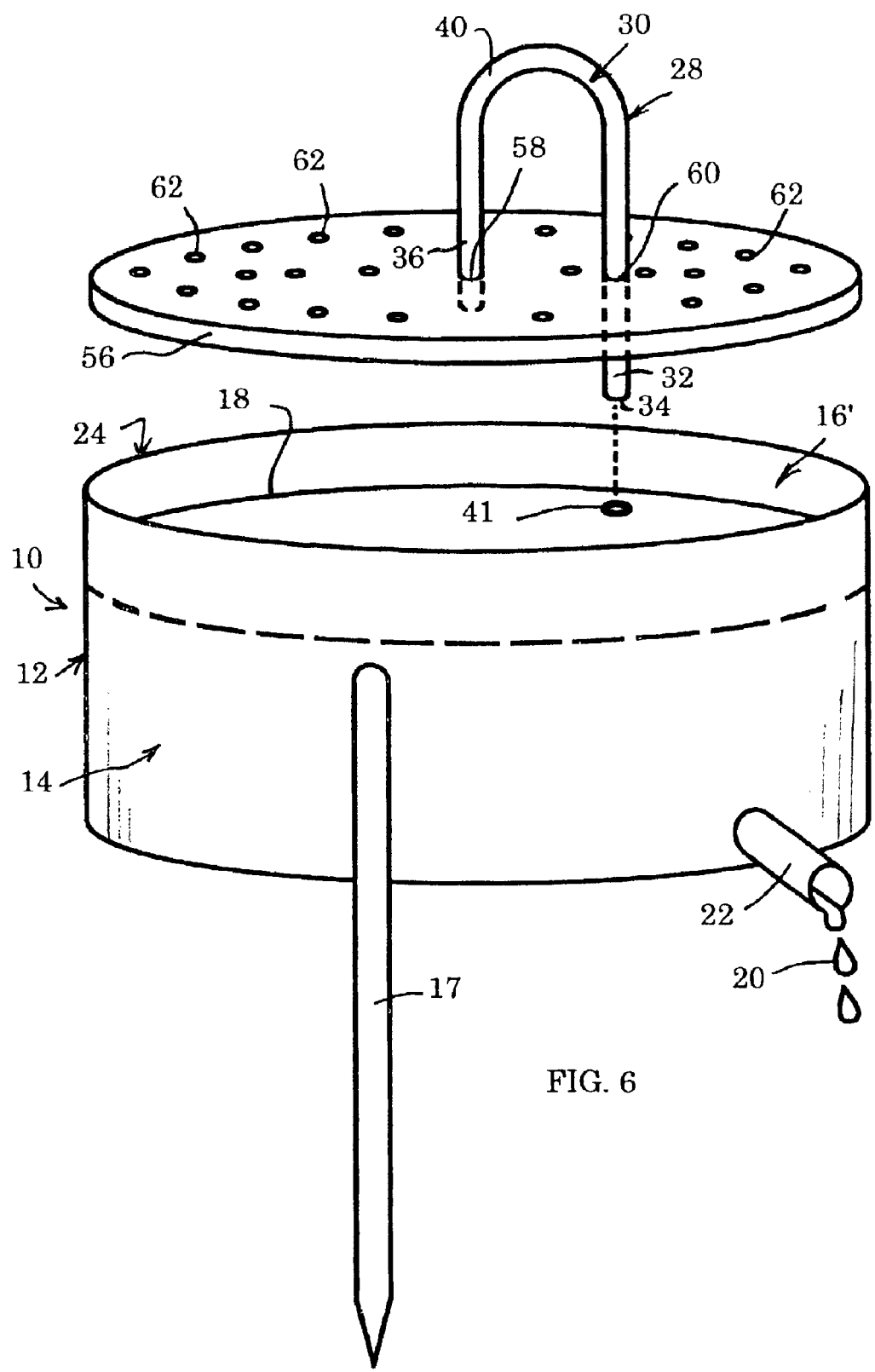
FIG. 6 is a side perspective view, with parts in elevation, of an alternate embodiment constructed in accordance with the present invention.

Referring now to the embodiment illustrated in FIG. 6, a time release device 10 is illustrated also having a container 12 with a first compartment 14 and a second compartment 16'. A discharge tube 22 extends from the first compartment 14 as in the prior embodiments. The first compartment 14 has an upper cover portion 18 with an opening 41 therein, also as in the prior embodiments. In this particular embodiment, however, the open end portion 24 is not entirely open to the ambient environment as in the prior embodiments. In this particular instance, a removable cover element 56 is positioned for covering the upper end portion 24 and enclosing the second compartment 16'. A central aperture 58 is provided so that the second end portion 36 of the conduit 30 may pass therethrough for positioning within the second compartment 16'. A second opening 60 is also provided so that the first end portion 32 may pass therethrough as well as through the opening 41 for positioning within the first compartment 14 as previously explained. In this manner, the arcuate central portion 40 is positioned exterior to and above the cover element 56.

The cover element 56 also includes a plurality of air openings 62 spaced thereacross. The air openings 62 provide fluid communication between the second body of liquid 26 in the second compartment 16' with the ambient environment exterior to the cover 56. The greater the size and/or number of apertures 62 in the cover 56, the faster the fluid within the second compartment 16' will evaporate. Therefore, the time delay afforded by the device 10 illustrated in FIG. 6 will be determined by the size and/or number of the apertures 62 in the cover element 56, which in turn control the evaporation rate of the fluid from the second compartment 16'. As in the prior embodiments, the time delay achieved before release of fluid through the discharge opening 22 is entirely dependent on the evaporation rate and amount of liquid in the second body of liquid within the second compartment of the device 10. The greater the amount of liquid or the slower the evaporation rate, the longer the time delay afforded by the device 10. As can be appreciated, this may be adjusted readily by the user of the device 10 and is also dependent on the environmental conditions and in particular the humidity of the ambient air.

Figure 7:
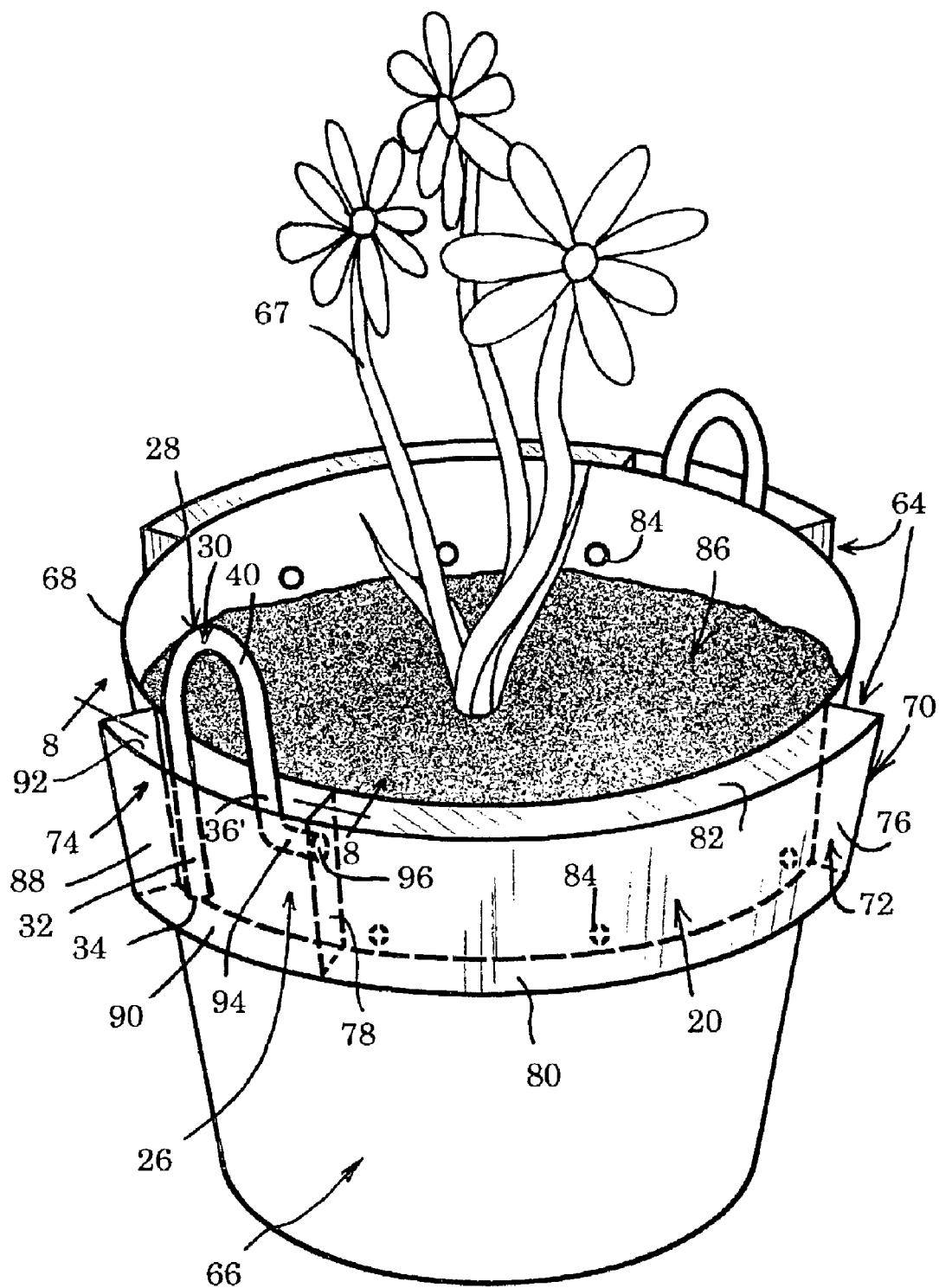
FIG. 7 is a side perspective view of yet another embodiment constructed in accordance with the present invention and adapted as an integral component of a flower pot.
Figure 8:
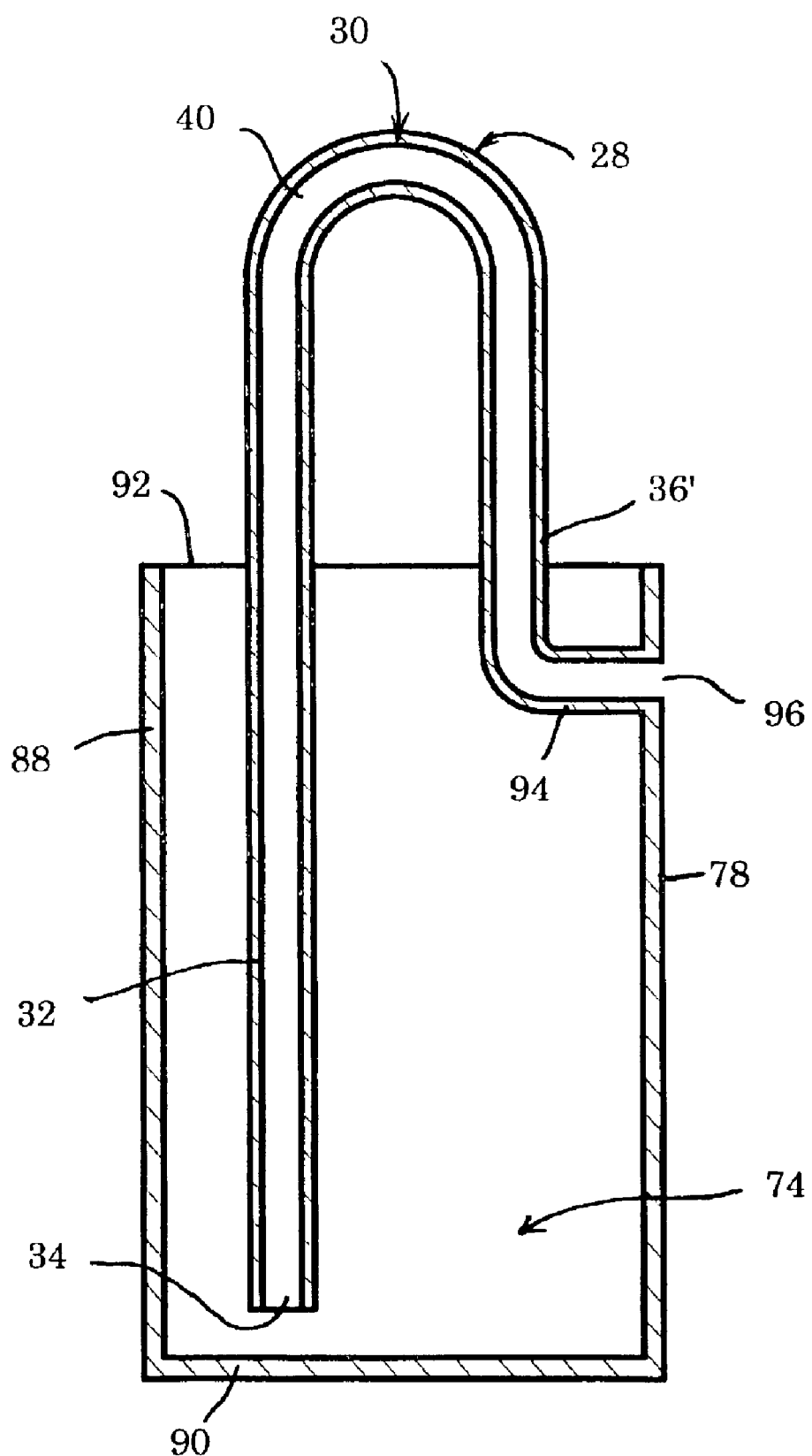
FIG. 8 is an enlarged cross sectional view taking substantially along line 8—8 of FIG. 7.

Referring now to FIGS. 7 and 8, an alternative form of the time release device 64 of the present invention is illustrated. In this particular instance, each of the devices 64 forms an integral component of a flower pot 66, containing a plant 67, along its upper edge 68. Each of the devices 64 is substantially identical. In the illustrated embodiment, the device 64 preferably includes a container 70 having a first compartment 72 and a second compartment 74. The first compartment 72 is analogous to the first compartment 12 of the prior embodiments, while the second compartment 74 is analogous to the second compartment 16 of the prior embodiments. The first compartment 72 is an enclosed chamber having a pair of side members 76,78, a bottom member 80, and a removable top member 82. A plurality of discharge openings 84, which are analogous to the discharge tube 22 of the prior embodiments, are located proximate the bottom member 80 and discharge into the pot 66 so as to water the soil 86 therein. The first compartment 72 is designed to enclose a first body of liquid 20.

The second compartment 74 is preferably defined on one side by the member 78 common with the first compartment 72, as well as a second side member 88 and a bottom member 90. The top portion 92 is preferably open to the ambient environment. The second compartment 74 is designed to enclose a second body of fluid 26 similar to the prior embodiments. The time release mechanism 28 is preferably in the form of a conduit 30 similar to that of the prior embodiments. The conduit 30 has a first end portion 32 which terminates in a first end opening 34 proximate the bottom member 90 of the second compartment 74. The second end portion 36' depends from a central arcuate portion 40 and includes an angled end element 94 which terminates in a second end opening 96. The end opening 96 passes through the wall 78 and communicates with the interior of the first compartment 72.

In operation, the first and second compartments 72,74 are filled with water through their respective top openings 82 and 92. The removable cover 82 is then repositioned to enclose the first compartment 72. Since the top opening 92 of the second compartment 74 is exposed to the ambient environment, the second body of liquid 26 therein evaporates over time. Eventually, the uppermost level of the liquid within the second compartment 72 moves below the end opening 34 so as to break the vacuum existing within the conduit 30. When this occurs, the liquid within the first compartment 72 is then released through the discharge openings 84 into the soil 86 due to the common opening 96 between the conduit 30 and the first compartment 72. As illustrated, the arcuate central portion 40 extends above both the first and second compartment 72,74, as in the prior embodiments. It is this elevated loop or arcuate portion 40 that creates the vacuum therein which in turn keeps the liquid within the first compartment 72 from flowing through the discharge openings 84 until such time is that vacuum is terminated. Consequently, depending on the environmental conditions surrounding the pot 66, a user can fill the second compartment 74 with any desired level of water to provide a predetermined time delay for watering the plant 67.

Figure 9:
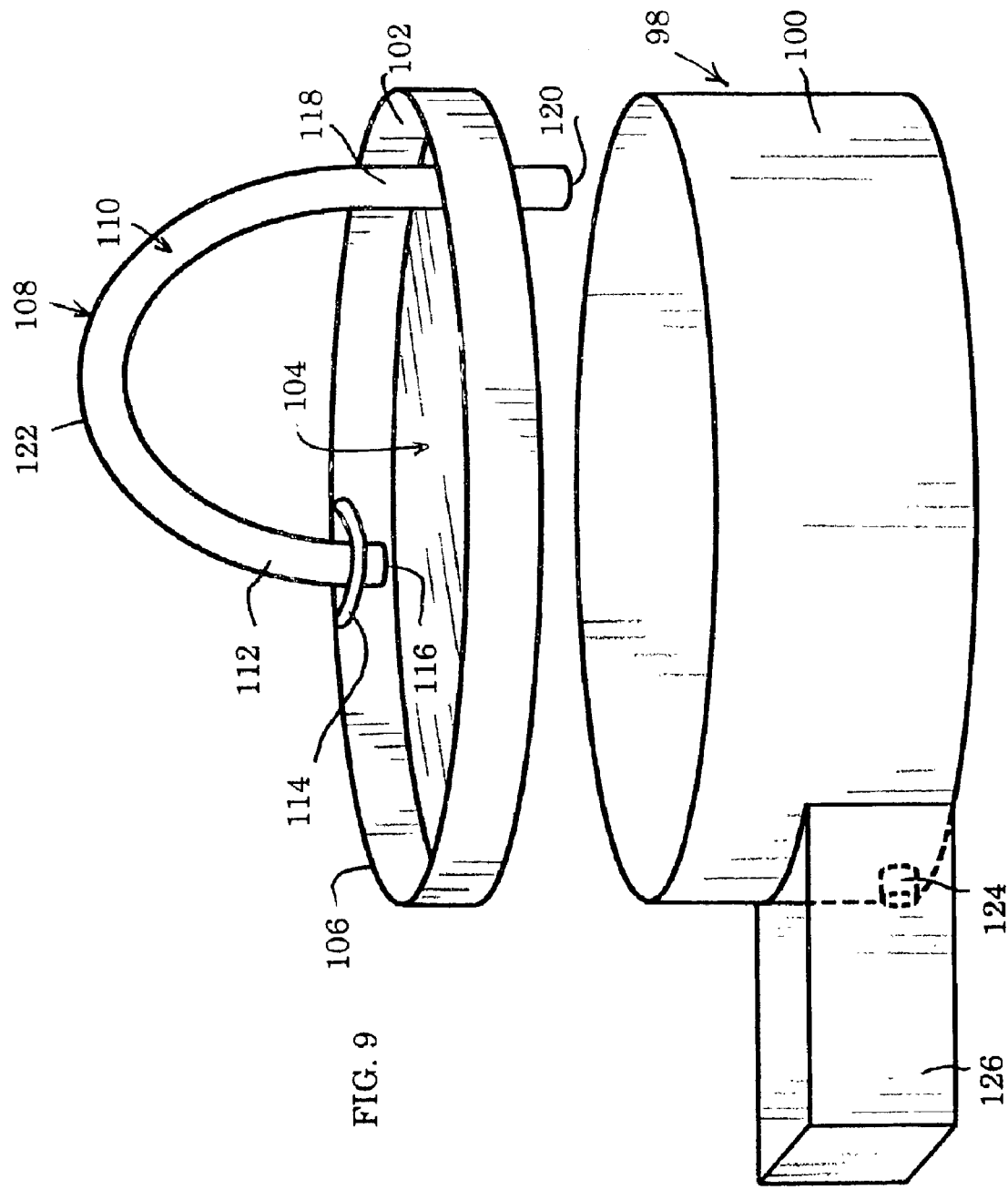
FIG. 9 is a side perspective view of still another embodiment constructed in accordance with the present invention and adapted for use with a livestock watering trough.

Turning now FIG. 9, the trigger mechanism of the present invention which is based on evaporation rates of a liquid from a container exposed to the environment may be applied to purposes other than time delayed watering of flowers or plants. Any particular application wherein delayed release of liquid without human intervention or activation is desired may benefit from the present invention. Referring to FIG. 9, a remote livestock watering system is disclosed. In this particular application of the invention, the container 98 includes a first compartment 100 which is designed for holding a first body of liquid, preferably water. A second compartment 102 is positioned over the first compartment 100 and includes a bottom element 104 which also functions as the upper cover element for the compartment 100, thereby enclosing the compartment 100. The second compartment 102 is designed to hold a second body of water. As illustrated, the second compartment 102 has its upper end 106 entirely exposed to the ambient environment. A trigger mechanism 108 in the form of a conduit 110 is provided. The conduit 110 includes a first end portion 112 secured by an attachment element 114 to the interior of the second compartment 102. The first end portion 112 terminates in an end opening 116 which is positioned close to the bottom 104 of the second compartment 102. The conduit 110 includes a second end portion 118 which passes through an aperture (not illustrated) in the bottom element 104 and extends into the first compartment 100. The second end element 118 terminates in an end opening 120 which is positioned in the upper portion of the first compartment 100. A central arcuate or loop portion 122 is provided in-between the first and second end portions 112,118, respectively.

As in the prior embodiments, when the first compartment 100 is filled with water and the second compartment 102 is placed thereon and then is filled with water, a vacuum is created within the conduit 110. As a result of this vacuum, the water within the first compartment 100 does not pass through the discharge tube 124 into a livestock watering trough 126. However, as the water within the second compartment 102 evaporates to the point were it falls below the end opening 116, the vacuum within the tube 110 is terminated which then releases the water from the first compartment 100 to the trough 126.

As can be seen from the above, the present invention provides a simple yet effective technique for the delayed release of liquid to an end user. The present invention does not require any external power sources. Moreover, it does not require the movement of water or liquid from one component or compartment to another. It is dependent strictly on the evaporation rate of a secondary body of liquid combined with a triggering mechanism for release of a primary body of liquid. The triggering mechanism is a simple vacuum arrangement which is actuated by the evaporation rate of the secondary or activation fluid. Moreover, the evaporation rate can be readily controlled by the end-user of the device of the present invention. The present invention has particular applicability of use for watering house plants when a resident is away for a period of time such as a vacation. Moreover, the present invention can be adapted to provide several different time release events so that a resident may be away in for quite an extended period of time without requiring someone to enter their house and attend to watering their plants or flowers. The present invention also has applicability to remote watering requirements such as open range livestock watering troughs. Finally, the present invention is simple in operation and construction and therefore inexpensive to manufacture and use.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

I claim:

1. A timed release irrigation device comprising:
    a unitary container having upper and lower chambers partitioned by a central separator plate therebetween, said lower chamber being enclosed and defining a first fluid reservoir adapted to contain a first body of liquid, and said upper chamber defining a second fluid reservoir for containing a second body of fluid;
    a liquid discharge member projecting from the bottom portion of said lower chamber for enabling selective release of liquid therefrom;
    said upper chamber having an open top portion to provide fluid communication between the second body of fluid and the ambient environment, said upper chamber second fluid reservoir having a closed bottom portion defined by said separator plate and a mechanism for regulating the evaporation rate of the second body of liquid to the ambient environment; and
    a trigger mechanism passing through said separator plate between said upper and lower chambers for releasing the liquid from said first fluid reservoir through said discharge member, said trigger mechanism being actuated by said evaporation rate regulating mechanism.

2. The irrigation device as claimed in claim 1, wherein said first fluid reservoir is enclosed by said upper cover portion and is sized and shaped to store the first body of liquid for gravity fed, time-delayed release through said discharge member.

3. The irrigation device as claimed in claim 2, wherein said second fluid reservoir is sized and shaped to contain the second body of liquid in selectively variable amounts, and wherein said evaporating rate regulation mechanism comprises an upper open surface in communication with the ambient environment to enable controlled evaporation of the second body of liquid to the environment.

4. The irrigation device as claimed in claim 3, wherein said evaporation rate regulating mechanism comprises an upper liquid surface entirely open to the ambient environment.

5. The irrigation device as claimed in claim 3, wherein said evaporation rate regulating mechanism comprises a top cover member disposed over said upper surface and having a plurality of apertures disposed therein to provide communication with the ambient environment.

6. The irrigation device as claimed in claim 1, wherein said trigger mechanism comprises a tubular element having first and second end portions defining first and second end openings, respectively, and a central arcuate portion intermediate said first and second end portions.

7. The irrigation device as claimed in claim 6, wherein said tubular element passes through said separator plate so that said first end portion is disposed within said first fluid reservoir for fluid communication with the first body of liquid, said tubular element second end portion being disposed proximate the closed bottom portion of said second fluid reservoir for fluid communication with the second body of liquid.

8. The irrigation device as claimed in claim 7, wherein said central arcuate portion is arranged to project above said upper chamber an effective amount to form a vacuum therein to prevent the release of liquid from said first fluid reservoir until activation by said evaporation rate regulating mechanism.

9. The irrigation device as claimed in claim 8, wherein said tubular element second end opening is selectively positioned above said second fluid reservoir closed bottom portion, and wherein said evaporation rate regulating mechanism activates said trigger mechanism upon evaporation of the second body of fluid to below the level of said second end opening to thereby terminate the vacuum in said arcuate portion and activate fluid flow through said discharge member.

10. The irrigation device as claimed in claim 1, wherein said first fluid reservoir further comprises a mounting bracket for attachment to a container adapted to receive fluid flow from said fluid discharge member.

11. The irrigation device as claimed in claim 10, wherein said container comprises a flower pot, and said mounting bracket is adapted to secure said first fluid flow reservoir to the edge of said flower pot.

12. An automatic liquid delivery system comprising:

an unitary container having upper and lower chambers partitioned by a central separator plate therebetween, said lower chamber being enclosed and adapted for storing a first liquid for selective delivery to an end user;

an outlet conduit for delivering the first liquid from the bottom portion of said lower chamber to the end user;

a receptacle defined by said upper chamber and adapted for storing a system activation fluid, said receptacle having an open top portion to provide fluid communication between the system activation fluid and the ambient environment to effect evaporation of the activation fluid; and a vacuum release mechanism for achieving time-delayed delivery of the first liquid through said conduit to the end user, said vacuum release mechanism being controlled by the evaporation rate of the system activation fluid from said receptacle and including a tubular element passing through said separator plate between said upper and said lower chambers of said unitary container.

13. The liquid delivery system as claimed in claim 12, wherein said vacuum release mechanism is actuated by evaporation of the system activation liquid beyond a predetermined level within said receptacle.

14. The liquid delivery system as claimed in claim 13, wherein said receptacle is sized and shaped for receiving selectively variable amounts of system activation fluid to enable correspondingly selectively variable time delays for activating said vacuum release mechanism.

15. The liquid delivery system as claimed in claim 14, wherein said receptacle includes a cover element disposed thereon, said cover element having a plurality of openings therein to enable fluid communication with the ambient environment for evaporation of the system activation fluid therefrom.

16. The liquid delivery system as claimed in claim 14, wherein said system comprises a plurality of said enclosed containers attached to each other with each said container including a corresponding receptacle and vacuum release mechanism, each said corresponding receptacle having a different quantity of system activation fluid therein corresponding to variable activation time delays.

17. The liquid delivery system as claimed in claim 12, wherein said vacuum release mechanism comprises a tubular element having first and second end portions defining first and second end openings, respectively, and a central arcuate portion intermediate said first and second end portions, said tubular element first end portion being disposed within said enclosed container for fluid communication with the first liquid, and said tubular element second end portion being disposed within said receptacle for fluid communication with the system activation fluid, said central arcuate portion being arranged to project above both said enclosed container and said receptacle an effective amount to form a vacuum therein to prevent the release of liquid from said enclosed container until evaporation of the system activation fluid.

18. The liquid delivery system as claimed in claim 17, wherein said tubular element second end opening is selectively positioned above the bottom surface of said receptacle, and wherein evaporation of the system activation fluid to below the level of said second end opening terminates the vacuum in said arcuate portion and activates fluid flow through said outlet conduit.

19. The liquid delivery system as claimed in claim 12, wherein said end use comprises a flower pot.

20. The liquid delivery system as claimed in claim 19, wherein said enclosed container and said receptacle include mounting brackets to removably attach said container and receptacle to said flower pot.

21. The liquid delivery system as claimed in claim 19, wherein said enclosed container and receptacle are integrally formed into a top edge portion of said flower pot.

22. The liquid delivery system as claimed in claim 12, wherein said end user comprises a live stock watering trough.

* * * * *